March 19, 1935. C. H. KIRBY Re. 19,503

DOWN DRAFT CARBURETOR

Original Filed May 31, 1929 4 Sheets-Sheet 1

Inventor
Charles H. Kirby
By Charles W. Bell
Atty

March 19, 1935. C. H. KIRBY Re. 19,503

DOWN DRAFT CARBURETOR

Original Filed May 31, 1929 4 Sheets-Sheet 2

Inventor
Charles H. Kirby
By Charles Allen
Atty

March 19, 1935. C. H. KIRBY Re. 19,503

DOWN DRAFT CARBURETOR

Original Filed May 31, 1929 4 Sheets-Sheet 3

Inventor
Charles H. Kirby
By Charles Bell
Atty

March 19, 1935. C. H. KIRBY Re. 19,503

DOWN DRAFT CARBURETOR

Original Filed May 31, 1929 4 Sheets-Sheet 4

Inventor
Charles H. Kirby
By Charles W. Allen
Atty

Reissued Mar. 19, 1935 Re. 19,503

UNITED STATES PATENT OFFICE 19,503

DOWN DRAFT CARBURETOR

Charles H. Kirby, Flint, Mich., assignor to Marvel Carbureter Company, Flint, Mich., a corporation of Illinois Original No. 1,918,974, dated July 18, 1933, Serial No. 367,211, May 31, 1929. Application for reissue May 29, 1934, Serial No. 728,193

16 Claims. (Cl. 261—34)

This invention relates to carburetors for internal combustion engines and has special reference to the down draft type of carburetors mounted above the level of the intake manifold and discharging downwardly therein.

Carburetors of the down draft type eliminate a number of troubles common to the more usual forms of up draft carburetors such as loading when the engine is checked to its idling speed after a spurt. It is accordingly an object of this invention to provide an improved carburetor of the down draft type incorporating a flap type of air valve for controlling the main air supply, together with a primary air supply formed as a by-pass around the air valve and having a common choke valve for both air supplies to render starting a cold engine easier by increasing the suction acting on the idling fuel supply. This arrangement permits making the air supply passages larger than would otherwise be the case and permits an increase in the capacity for a given size over the up draft type as the mixing chamber may be made considerably larger without developing body loading due to low air velocities.

It is another object of this invention to provide an improved accelerating fuel supply arrangement comprising separate accelerating pumps incorporated in the low and high speed fuel supply conduits and separately actuated by the throttle and air valve so that the accelerating charges for the two sets of nozzles can be separately controlled to provide maximum performance at intermediate speed ranges with a further refinement as to regulation of the accelerating fuel supply according to the rapidity of opening of the throttle and air valve.

It is also an object of this invention to provide an improved accelerating fuel supply embodying a seasonal regulating means for varying the effectiveness of the accelerating pump to increase or decrease the amount of fuel delivered by the pump in accordance with the requirements of the engine under different operating conditions.

It is still another object of this invention to provide a carburetor of the type described embodying features adapted to develop maximum performance while being comparatively simple to manufacture, assemble and service, with the maximum adjustability for different operating conditions and requirements.

Other and further important objects of this invention will be apparent from the disclosures in the specification and accompanying drawings.

The invention (in a preferred form) is illustrated on the drawings and hereinafter more fully described.

Figure 3:
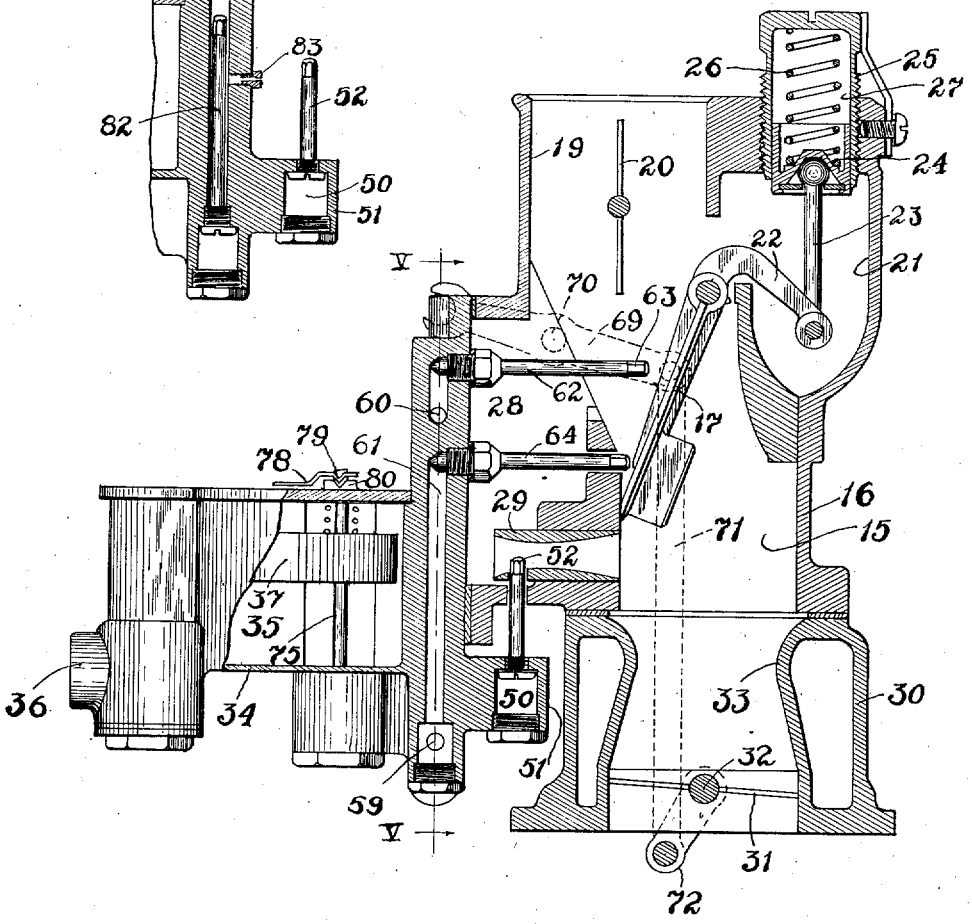
Figure 3 is a section on line III—III of Figure 1.

As shown on the drawings: The carburetor as a whole comprises a downwardly discharging mixing chamber 15 in a body member 16, an air valve 17 therein mounted on a cross shaft 18 to control the major portion of the air supply over and above the maximum requirements for satisfactory idling. The entire air supply enters through a passage 19 in the body which is controlled by a choke valve 20 of the usual type. The body member 16 forms a separate casting having in addition to the mixing chamber 15 and passage 19, a chamber 21 for an air valve dash pot lever 22 and link 23 connected to a piston 24 operating in an externally adjustable sleeve 25 containing a spring 26 urging the piston 24 downwardly. From the linkage shown in Figure 3 it will be evident that the opening movement of the air valve 17 is resisted by the spring 26 as well as the damping effect of the closed air chamber 27 formed within the sleeve above the piston. The air valve is counterbalanced as shown to compensate for the weight of the piston. By screwing down on the sleeve the initial spring pressure may be increased to increase the resistance of the air valve thus in effect enriching the fuel to air mixture ratio. The body member 16 also contains a bypass passage 28 leading around the closed air valve to a horizontally located primary venturi 29 discharging into the mixing chamber 15 below the air valve. The outlet or bottom of the mixing chamber connects to a separate jacketed member 30 containing a throttle valve 31 on a throttle shaft 32, the passage 33 in the member 30 being given a Venturi form to assist in securing a well balanced mixture of the low speed or primary supply and that passing the air valve.

The fuel supply and metering arrangements are located in a separate body 34 secured to the side of the body member 16 and comprise separate low and high speed fuel feeding systems each having individual accelerating pumps. A fuel chamber 35 has a fuel inlet connection 36 and the usual float 37 controlling said inlet.

Figure 5:
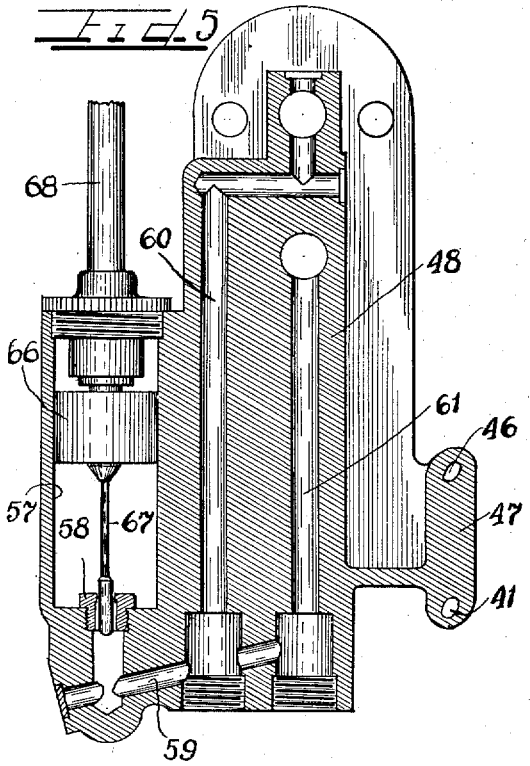
Figure 5 is a section on the line V—V of Figure 3.
Figure 6:
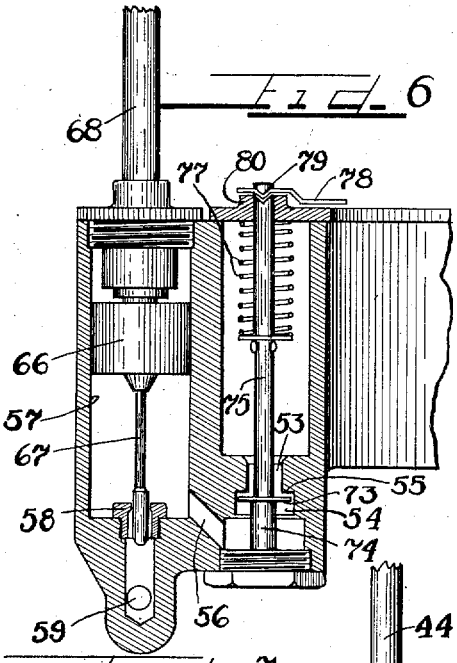
Figure 6 is a section on the line VI—VI of Figure 2.
Figure 7:
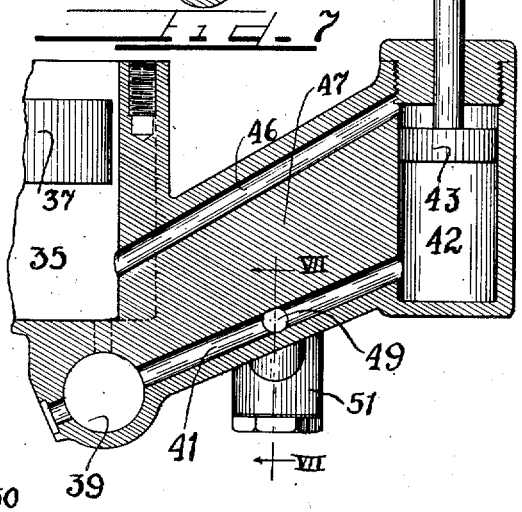
Figure 7 is a section on the line VII—VII of Figure 2.
Figure 8:
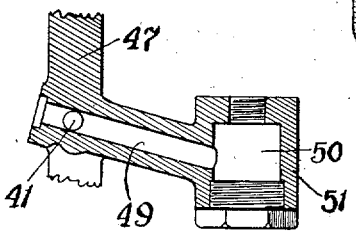
Figure 8 is a section on the line VIII—VIII of Figure 2.
Figure 9:
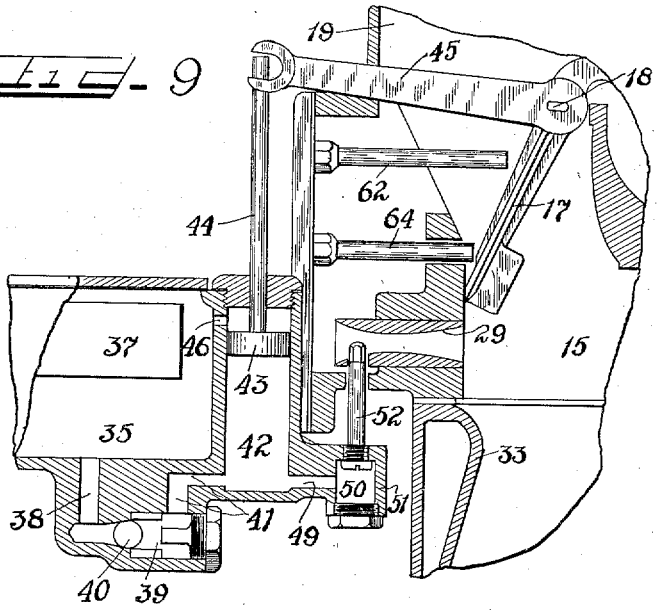
Figure 9 is a distorted or diagrammatic layout showing the entire path of fuel travel to the low speed nozzle as separately shown in Figures 3, 7 and 8.
Figure 10:
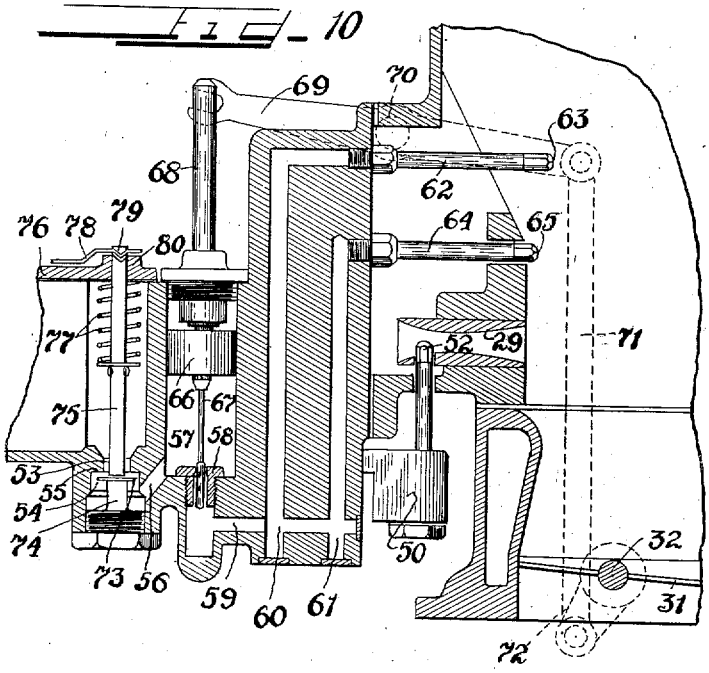
Figure 10 is a similarly diagrammatic showing of the fuel passages for the high and intermediate speed fuel nozzles, the various passages shown in Figures 3, 5 and 6 being laid out in a common plane.

The low speed fuel supply to the primary venturi 29 comprises a downwardly extending passage 38 opening from the fuel chamber 35 and connecting to a horizontal ball check chamber 39 containing a ball 40, the chamber 39 having a tapered ball seat so formed as to normally hold the ball off its seat by its own weight until the back flow of fuel reaches a velocity sufficient to roll the ball up against its seat when the accelerating pump is operated at a predetermined rapidity. From the chamber 39 a passage 41 leads into an accelerating pump chamber 42 containing a piston 43 and piston rod 44 linked by a lever 45 to the air valve shaft 18 so that the piston is moved downwardly during the opening movement of the air valve and vice versa. The chamber 42 has a relief passage 46, leading back to the fuel chamber from above the piston to prevent air binding during the closing movement of the air valve. This passage 46 together with the passage 41 are formed in a boss 47 connecting the fuel chamber to a nozzle supporting member 48, as best shown in Figure 7, while the diagrammatic showing of Figure 9 gives a much clearer disclosure of the purpose of these connections. As shown in Figure 9 an outlet passage 49 leads from the accelerating pump chamber 42 to a chamber 50 in a boss 51 supporting a low speed nozzle 52 which extends upwardly into the throat of the primary venturi 29. In the actual structure as shown in Figures 7 and 8 the passage 49 branches off from the passage 41, part of the fuel discharging through the nozzle 52 and part returning to the fuel chamber 35 past the ball 40 unless this ball is seated by the backward rush of fuel when the air valve opens so suddenly as to close this ball check. The intermediate and high speed fuel supply, which functions upon opening of the air valve 16, is best shown diagrammatically in Figure 10 as this figure correlates the sections shown in Figures 3, 5 and 6. A passage 53 from the fuel chamber opens into a valve chamber 54, a flat valve seat 55 being formed around the opening. From this chamber a passage 56 leads to an accelerating pump chamber 57 and thence through a bushing 58 and a passage 59 to two vertical passages 60 and 61 in the nozzle supporting member 48, the passage 60 leading to a high speed nozzle tube 62 having a restricted orifice tip 63 while the passage 61 leads to a lower intermediate speed nozzle tube 64 restricted by a tip 65. The two nozzles terminate adjacent the air valve in a position to discharge fuel into the air stream flowing past the valve when the latter is opened to a greater or less extent by the engine suction. The two nozzles thus have a common fuel supply, the intermediate nozzle coming into action first due to its lower hydrostatic head as well as the suction set up past its tip due to a partial opening of the air valve.

The accelerating pump chamber 57 previously mentioned contains a piston 66 having a downwardly extending metering rod 67 entering the bushing 58 to restrict the orifice therethrough. This rod is so formed as to nearly close the orifice for the first portion of the downward movement of the piston and is cut down to a smaller diameter to enlarge the opening for the later portion of the piston travel. The piston has a piston rod 68 engaged by an arm 69 pivoted at 70 and connected by a link 71 to a lever 72 on the throttle shaft 32, the linkage being so arranged that an opening movement of the throttle valve forces the piston 66 downwardly. As at the usual driving range it is desired to maintain conditions of maximum economy the rod 67 is so calibrated as to restrict the fuel supply flowing through the bushing 58 while for maximum power at nearly full throttle, the restriction is practically eliminated by the reduced diameter of the rod 67.

The valve chamber 54 contains a disc valve 73 supported on a pilot 74 in a position clear of the flat valve seat 55 but close thereto so that the pressure developed by the accelerating pump is adapted to lift the disc against its seat to prevent return of the fuel to the fuel chamber 35. As the accelerating charge supplied to the higher speed nozzles is not required for proper performance in summer weather a seasonal control adjustment is provided comprising a rod 75 projecting through the cover 76 of the fuel chamber 35. This rod is urged downwardly by a spring 77 and its lower end acts to hold the disc 73 away from its seat thus rendering the accelerating pump inactive. The position of the rod may be adjusted in any convenient manner to control the upward or seating movement of the disc 73. As shown the exposed end of the rod carries a lever 78 having V shaped downwardly pointing projections 79 which drop into corresponding notches in a boss 80 on the cover to form the summer adjustment, while when the lever is turned to cause the projections to ride up on the boss the rod is raised and the disc is free to rise against its seat, rendering the accelerating pump fully effective. A series of notches can be provided of varying depths in the boss to give a series of adjustments between the extremes mentioned.

Figure 2:
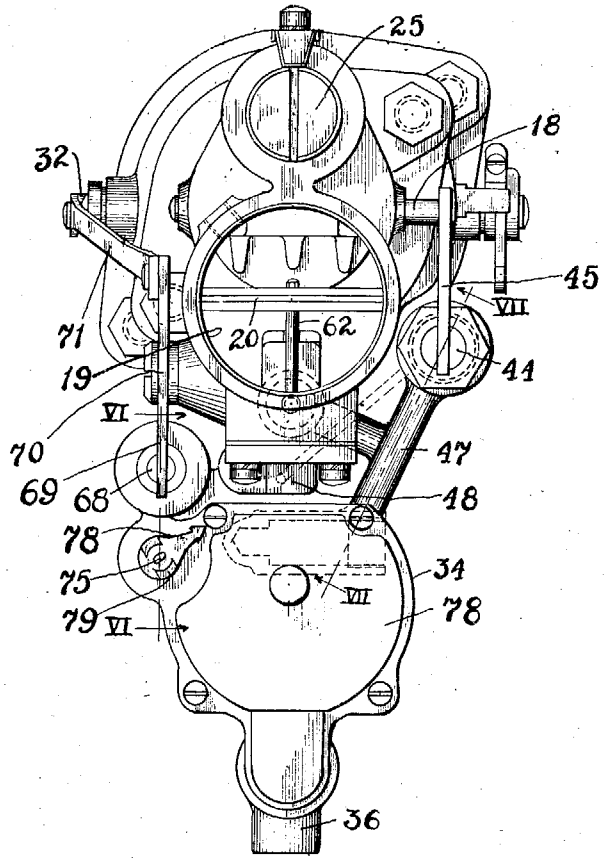
Figure 2 is a plan view thereof.
Figure 1:
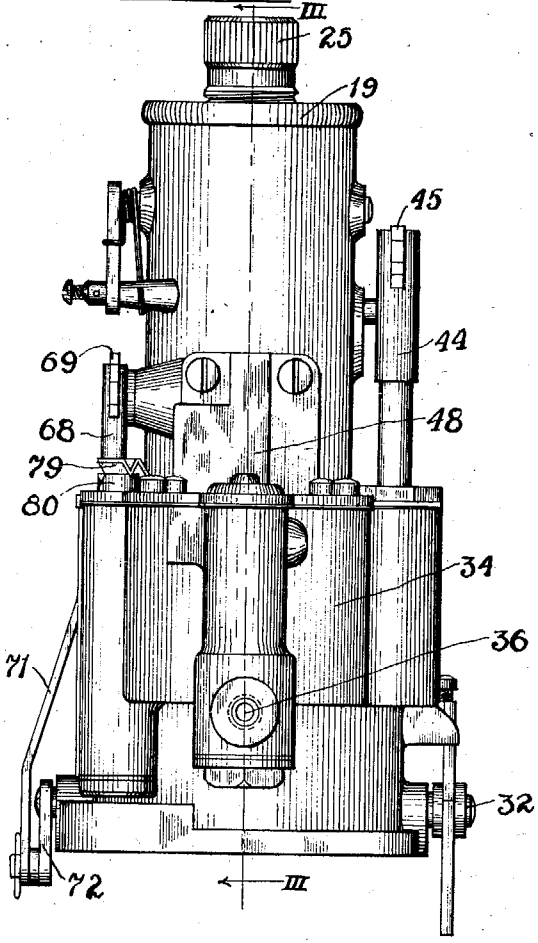
Figure 1 is an elevation of a carburetor embodying the features of this invention.
Figure 4:
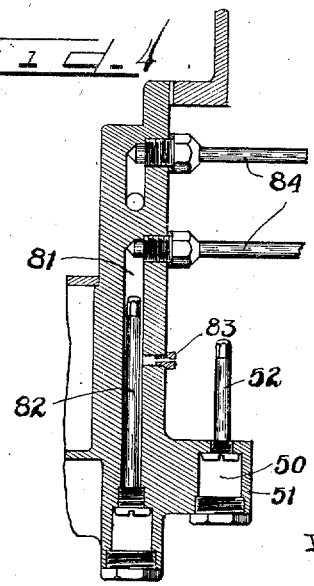
Figure 4 is a fragmentary detail section of a modified nozzle structure.

Figure 4 illustrates an alternative form of nozzle structure wherein intermediate and high speed nozzles 84 are of the air bleed type and hence unrestricted. In this form the vertical passage 81 is provided with a fuel metering nozzle 82, the passage 81 having an air bleed connection 83. The passage 81 shown feeds the lower or intermediate nozzle, a similar passage and metering nozzle controlling the feed to the upper nozzle passages corresponding to 60 in Figure 3.

In the operation of this carburetor closing the choke valve for starting cuts off the entire air supply except for leakage about the choke valve, and hence assures the maximum suction within the carburetor when the engine is turned over so that the fuel drawn from the low speed nozzle will form a very rich priming mixture that will facilitate firing even a very cold engine.

When the engine is running idle with the choke valve open, the air valve remains closed, the air supply passing through the small primary venturi where it is mixed with fuel discharged from the low speed nozzle. Under such operating conditions the discharge ends of the two higher speed nozzles are not subjected to sufficient suction to lift fuel even to the level of the intermediate fuel nozzle.

As the throttle is gradually opened from the idling position the intermediate nozzle begins to supply fuel as the suction in the mixing chamber increases to a point sufficient to swing the air valve partially towards its open position. If the throttle movement is slow, the high speed accelerating pump moves slowly enough to permit the return of most of the fuel below the pump piston to the fuel chamber past the disc valve 73. On the other hand if the throttle opening is rapid more fuel will be injected through the nozzles and less fuel will be returned to the fuel chamber. A sudden opening of the throttle also results in a rapid opening of the air valve, due to the application of a high manifold suction thereto and the air valve in turn actuates the low speed accelerating pump, a rapid motion of which seats the ball check valve and causes the accelerating pump to both eject fuel through the low speed nozzle and to act as a dash pot to slow down the opening movement of the air valve to prevent fluttering thereof due to uneven suction impulses in the manifold. It is to be noted that this action is a one way one effective only in opposing the rapid opening of the air valve.

During the latter part of the throttle opening movement the corresponding downward movement of the high speed accelerating pump enlarges the effective fuel passage in the bushing 58 and thus gives a richer mixture through the two higher speed nozzles thus materially increasing the power of the engine in the range close to full open throttle, while maintaining a more economical fuel and air mixture ratio for the more common operating conditions of a partly open throttle.

It will thus be seen that I have provided an improved downdraft carburetor embodying features of a variable accelerating charge control amendable both to the seasonal and operating variations in the amount of accelerating fuel required to maintain satisfactory acceleration without loading, together with a lean and economical mixture ratio for normal operating conditions while having in reserve a richer mixture ratio to develop maximum power at full throttle. Further, starting a cold engine is made easier by cutting off the primary air supply as well as the main air supply by a common choke valve.

I am aware that numerous details of construction may be varied through a wide range without departing from the principles of this invention, and I therefore do not purpose limiting the patent granted, otherwise than necessitated by the prior art.

I claim as my invention:

1. In a carburetor, a downwardly discharging mixing chamber, a flap valve controlling the admission of the major quantity of air thereto, a venturi controlling the admission of primary air thereto, a common air inlet for both air supplies, a choke valve controlling said air inlet, a fuel supply chamber, separate fuel supply conduits discharging into the separate air supplies entering said mixing chamber and accelerating pumps associated with each supply conduit.

2. In a carburetor, a downwardly discharging mixing chamber, a flap valve controlling the admission of the major quantity of air thereto, a venturi controlling the admission of primary air thereto, a common air inlet for both air supplies, a choke valve controlling said air inlet, a fuel supply chamber, separate fuel supply conduits discharging into the separate air supplies entering said mixing chamber, accelerating pumps associated with each supply conduit and means for regulating the delivery of said pumps.

3. In a carburetor of the down draft type in combination with a fuel supply chamber separate high and low speed fuel supply conduits and nozzles, accelerating pumps associated with each fuel conduit, means for varying the delivery from one of said accelerating pumps and means associated with each pump adapted to render said pumps inoperative below a predetermined rapidity of action.

4. In a down draft carburetor including a mixing chamber, a fuel chamber, a throttle valve and an air inlet passage, a primary venturi drawing air from said air-inlet passage and discharging into said mixing chamber, an air valve controlling the passage of the main air supply from said air inlet to said mixing chamber, a fuel supply conduit and nozzle discharging into said primary venturi, a second fuel supply conduit and nozzles discharging into said main air supply adjacent the air valve, an accelerating pump in one of said fuel supply conduits and linkage connecting said pump to the throttle to be actuated thereby.

5. In a down draft carburetor including a mixing chamber, a fuel chamber, a throttle valve, and an air inlet passage, an air valve controlling the supply of air from said air inlet to said mixing chamber, a bypass air passage around said air valve, said passage including a primary venturi, a fuel supply conduit discharging into said venturi, a second fuel supply conduit and nozzles discharging into said main air supply adjacent the air valve, an accelerating pump in said second fuel supply conduit and linkage connecting said pump to the throttle to be actuated thereby.

6. In a down draft carburetor including a mixing chamber, a fuel chamber, a throttle valve and an air inlet passage, an air valve controlling the supply of air from said air inlet to said mixing chamber, a bypass air passage around said air valve said passage including a primary venturi, a fuel supply conduit discharging into said venturi, a second fuel supply conduit and nozzles discharging into said main air supply adjacent the air valve, an accelerating pump in said second fuel supply conduit, linkage connecting said pump to the throttle to be actuated thereby, and means actuated by said pump adapted to meter the fuel in said second conduit in accordance with the throttle opening.

7. In a down draft carburetor including a mixing chamber, a fuel chamber, a throttle valve and an air inlet passage, an air valve controlling the supply of air from said air inlet to said mixing chamber, a bypass air passage around said air valve said passage including a primary venturi, a fuel supply conduit discharging into said venturi, a second fuel supply conduit and nozzles discharging into said main air supply adjacent the air valve, an accelerating pump in said second fuel supply conduit, linkage connecting said pump to the throttle to be actuated thereby and means in said second fuel supply conduit adapted to adjustably vary the effectiveness of the pump.

8. In a down draft carburetor including a mixture chamber, a fuel chamber, a throttle valve and an air inlet passage, an air valve controlling the supply of air from said air inlet to said mixing chamber, a bypass air passage around said air valve said passage including a primary venturi, a fuel supply conduit discharging into said venturi, a second fuel supply conduit and nozzles discharging into said main air supply adjacent the air valve, an accelerating pump in said second fuel supply conduit, linkage connecting said pump to the throttle to be actuated thereby, means actuated by said pump adapted to meter the fuel in said second conduit in accordance with the throttle opening and means in said second fuel supply conduit adapted to adjustably vary the effectiveness of the pump.

9. In a down draft carburetor including a downwardly discharging mixing chamber, a fuel chamber, a throttle valve and an air inlet passage, an air valve controlling the supply of air from said air inlet to said mixing chamber, means for adjustably retarding the opening movement of said air valve, a bypass air passage around said air valve said passage including a primary venturi discharging into said mixing chamber, a fuel supply conduit discharging into said venturi, an accelerating pump in series with said conduit, and linkage connecting said pump and air valve.

10. In a down draft carburetor including a mixing chamber, a fuel chamber, a throttle valve and an air inlet passage, an air valve controlling the supply of air from said air inlet to said mixing chamber, means for adjustably retarding the opening movement of said air valve, a bypass air passage around said air valve, said passage including a primary venturi, a fuel supply conduit discharging into said venturi, an accelerating pump in series with said conduit and linkage connecting said pump and air valve, and means in said fuel supply for rendering said accelerating pump ineffective below a predetermined rapidity of movement.

11. In a carburetor a downwardly discharging mixing chamber, an air inlet passage extending upwardly from said chamber, a flap type, suction-operated, air valve interposed between the mixing chamber and the inlet passage controlling the flow of air from the passage to the chamber, a bypass air passage for primary air leading from the inlet passage and terminating in a horizontally disposed venturi discharging into the mixing chamber below the air valve, a low-speed nozzle discharging into said venturi, an intermediate and a high speed nozzle horizontally disposed and discharging into the inlet passage immediately above the air valve, the intermediate speed nozzle being spaced vertically below the high speed nozzle and discharging when said air valve is partially open, said high speed nozzle discharging when said valve is opened to a greater extent, and fuel supply passages for said nozzles.

12. In a carburetor a downwardly discharging mixing chamber, an air inlet passage extending upwardly from said chamber substantially in vertical alinement therewith, an air valve operated by suction and controlling the flow of air directly from said inlet passage to said chamber, a bypass air passage for bypassing primary air around said valve leading from the inlet passage above said valve and terminating in a horizontally disposed venturi discharging into the mixing chamber below the air valve, a primary fuel supply discharging into said venturi, and a secondary fuel supply discharging into the inlet passage immediately above the air valve and controlled thereby to discharge when the suction is sufficient to open the air valve.

13. In a carburetor a downwardly discharging mixing chamber, an air inlet passage extending upwardly from said chamber, a suction operated air valve controlling the supply of air from the inlet passage to the mixing chamber, a bypass air passage for bypassing primary air around said valve leading from the inlet passage above said valve and terminating in a venturi discharging into the mixing chamber below the air valve, a low speed fuel supply conduit discharging into the venturi, an intermediate speed nozzle and a high speed nozzle vertically spaced and discharging into the inlet passage adjacent the air valve, and a fuel supply conduit for each of said nozzles.

14. In a carburetor a downwardly discharging mixing chamber, an air inlet passage extending upwardly from said chamber, a suction operated air valve controlling the flow of air directly from the inlet passage to the chamber, a bypass air passage for bypassing primary air around said valve leading from the inlet passage above said valve and terminating in a venturi discharging into the mixing chamber below the air valve, a primary fuel supply discharging into said venturi, a vertical duct terminating in a nozzle discharging into the inlet passage immediately above the air valve and controlled thereby, a metering nozzle in said duct connected to a fuel supply, and an air bleed opening for said duct forming with the metering nozzle an emulsion of fuel and air.

15. In a carburetor a downwardly discharging mixing chamber, an air inlet passage extending upwardly from said chamber, an air valve operated by suction and controlling the flow of air directly from said inlet passage to said chamber, a bypass air passage for bypassing primary air around said valve leading from the inlet passage above said valve and terminating in a venturi discharging into the mixing chamber below the air valve, a primary fuel supply discharging into said venturi, and means forming an emulsion of fuel and air discharging into the inlet passage immediately above the air valve and controlled in accordance with the extent of opening thereof.

16. In a carburetor a downwardly discharging mixing chamber, an air inlet passage extending upwardly from said chamber, an air valve operated by suction and controlling the flow of air directly from said inlet passage to said chamber, an air passage for bypassing primary air around said valve leading from the inlet passage above said air valve and terminating in a venturi discharging into the mixing chamber below the air valve, said by-pass air passage having its end leading from said inlet passage projecting into said inlet passage beyond the wall thereof in a substantially upward direction, a fuel supply chamber, and separate fuel supply means discharging respectively into the venturi and into the inlet passage above the air valve, the discharge into the inlet passage being controlled by the extent of opening of said air valve.

CHARLES H. KIRBY.